March 10, 1931. W. S. MARVIN ET AL 1,795,873
FUSIBLE SWITCH FOR ELECTRICALLY HEATED ELEMENTS
Filed Feb. 23, 1929

Patented Mar. 10, 1931

1,795,873

UNITED STATES PATENT OFFICE

WALTER S. MARVIN AND CARL L. SIBENHORN, OF TWO RIVERS, WISCONSIN, ASSIGNORS TO METAL WARE CORPORATION, OF TWO RIVERS, WISCONSIN

FUSIBLE SWITCH FOR ELECTRICALLY-HEATED ELEMENTS

Application filed February 23, 1929. Serial No. 342,074.

This invention relates to new and useful improvements in fusible switches for electrically heated elements.

One of the objects of my invention is the provision of a fusible switch adapted to be incorporated in the circuit for an electrically heated element which is particularly adapted for use in connection with coffee percolators and similar articles, although its application to these particular articles is not limited.

Another object of the invention is the provision of a fusible switch adapted to be positioned within the circuit of an electrically heated element and is so constructed and arranged that it may be quickly placed in position or removed and the fusible switch may be readily replaced when burned out.

A further object of the invention is the provision of a fusible switch adapted to be used in connection with the electrically heated element of coffee percolators or similar articles, whereby when the heat beneath the article being heated reaches a certain degree, the switch will be melted or fused in order to disconnect the circuit to the electrically heated element, so as to prevent overheating of the parts around the element.

A further object of the invention is the provision of a device of the above character wherein the parts are assembled in a single unit adapted to be placed in position and maintain inoperative position by means of the securing member carried by the electrically heated element and whereby the unit may be quickly removed when desired.

With the above and other objects in view, the invention consists in the novel features of construction, the combination and arrangement of parts hereinafter more fully set forth, pointed out in the claims and shown in the accompanying drawings wherein:

Figure 1:
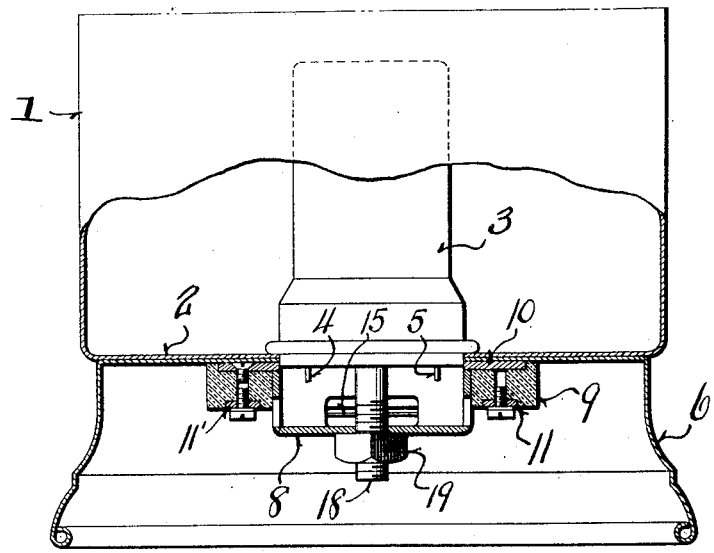
Figure 1 is a single view on the line 1—1 of Figure 2; illustrating the application of my device.
Figure 2:
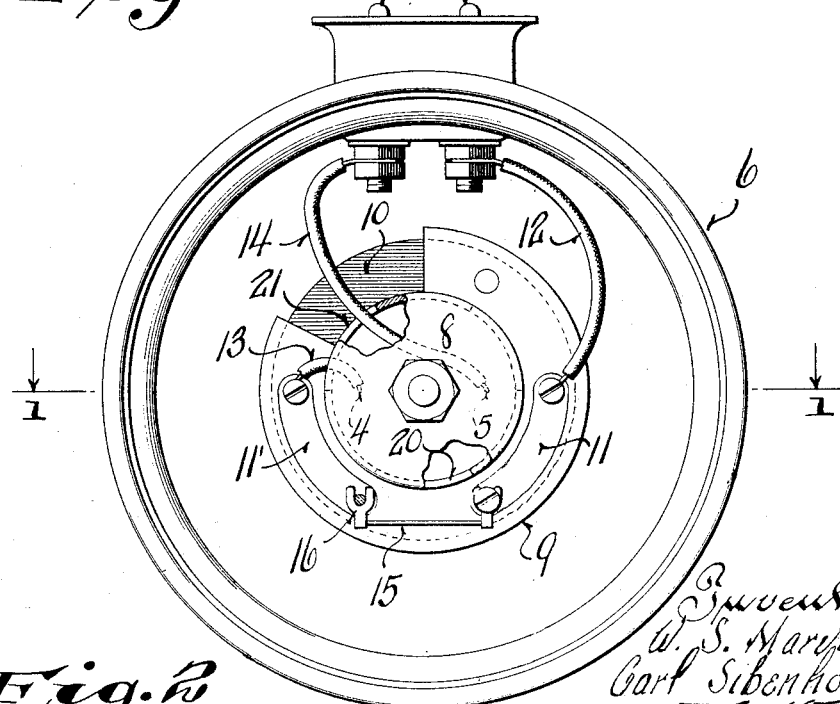
Figure 2 is a bottom plan view of a coffee percolator showing the application of the device with parts thereof broken away and illustrated in cross section.

Referring more particularly to the drawings wherein the invention and its application are illustrated, 1 indicates the body of the coffee percolator or similar article having the bottom 2 formed with an opening to receive therethrough the electrically heated element 3 having terminals 4 and 5 to which a source of electrical supply is connected. The body 1 is supported upon a base member 6 and carried by the base are the plugs 7 adapted to be engaged with a socket for completing the connection to the electrical supply.

The unit which carries the fusible switch comprises a cup-like member 8 with an insulating rim 9. The rim 9 is provided in one face thereof with a recess adapted to receive a plate 10 which bears against the lower surface of the bottom or base member 6 around the openings through which is positioned the element 3.

This plate is secured in position in any suitable manner and helps to reinforce the top of the base member 6 around the opening therein.

Imbedded within the surface of the rim 9 are the connecting plates 11 and 11′, the plate 11 being connected at one end to one of the plugs 7 by the conductor 12, the other plate 11′ having one end connected to the terminal 4 by the conductor 13. The other terminal 5 is connected to the second plug 7 by the conductor 14. The ends of the plates 11 and 11′ opposite their connections with the conductors 12 and 13 are connected by means of a fusible switch 15. This fusible switch comprises the yoke clamps 16 held in contacting engagement with the plates 11 and 11′ by means of the set screws 17 and these yokes 16 are connected by means of the fusible switch element 15. From this, it will be apparent that when the element 15 is fused or melted, the current will be broken to the element 3.

The element 3 carries a threaded bolt 18 which is extended down through the cap member 8 and has a nut 19 on its lower end adapted to retain the cap member in place, which in turn will retain the rim 9 in place against the top of the base member 6.

The cap member 8 is provided with a plurality of air ports, port 20 being located adjacent the fusible switch 15, so that the heat from the element 3 will be directed toward the switch. The port 21 is used for permitting passage of the conductors which lead to the terminals of the heating element, and also permits circulation of air beneath element 3.

It will be apparent from the foregoing that when the element 3 becomes overheated, the space within the base 6 will become heated to a predetermined degree and fuse or melt the switch element 15 breaking the connection to the element 3. It will be noted that the construction of the switch member 15 is of such nature that a burned out switch can be quickly replaced with a new one.

It will be apparent that the advantage of my improvement will lie in the fact that a party connecting up a coffee percolator with the current turned on will not necessarily have to maintain a close watch in order to prevent overheating of the article, but the current to the heating element will be quickly broken when the element reaches a predetermined heating capacity or the heat accumulating within the base 6 rises to a degree sufficient to fuse or melt the switch member 15. Therefore, if an electrically heated container is apparently neglected, this improved fusible connection to the heating element of the container will automatically break the circuit to the heating element and prevent damage to the container.

While we have shown and described the preferred embodiment of our invention, it will be apparent that slight changes may be made in the construction when putting the invention into practice without departing from the spirit of the same or the scope of the appended claims.

We claim

1. In a device of the character described, an electrically heated element, a cap member arranged adjacent the element and enclosing the terminals thereof, said cap having a plurality of openings therein, means forming connection between the element and a source of electrical supply, and means incorporated within the connection between the element and electrical supply and arranged directly opposite one of the openings whereby to sever connections between the element and source of electrical supply when the element is heated to a predetermined degree.

2. In a device of the character described, an electrically heated element, a cap for enclosing the terminals of said element, having a plurality of openings, means forming connection between the element and a source of electrical supply and a fusible switch incorporated within the connections between the element and source of electrical supply, and arranged directly opposite one of the openings to be positioned in the path of the heat radiating from the element whereby to break the connection between the element and source of electrical supply when the element is heated to a predetermined degree.

3. In a device of the class described, a pair of spaced terminals, a pair of spaced plugs remote from the terminals, a conductor forming a direct connection between one of the plugs and one of the terminals, spaced connecting plates, a fusible element connecting said plates, a conductor connecting one of said plates with the other terminal, and a conductor connecting the other plate with the other plug.

4. In a device of the character described, an electrically heated element, a cap for enclosing the terminals of said element, having a plurality of openings, means forming connection between the element and a source of electrical supply and a fusible switch removably arranged within the connections between the element and source of electrical supply, and arranged directly opposite one of the openings to be positioned in the path of the heat radiating from the element whereby to break the connection between the element and source of electrical supply when the element is heated to a predetermined degree.

In testimony that we claim the foregoing we have hereunto set our hands at Two Rivers, in the county of Manitowoc and State of Wisconsin.

WALTER S. MARVIN.
CARL L. SIBENHORN.